United States Patent
Hall et al.

(10) Patent No.: US 7,193,526 B2
(45) Date of Patent: Mar. 20, 2007

(54) DOWNHOLE TOOL

(75) Inventors: David R. Hall, Provo, UT (US);
Andrei Muradov, Houston, TX (US);
David S. Pixton, Lehi, UT (US); Scott Steven Dahlgren, Alpine, UT (US);
Michael A. Briscoe, Lehi, UT (US)

(73) Assignee: IntelliServ, Inc., Provo, UT (US)

( * ) Notice: Subject to any disclaimer, the term of this patent is extended or adjusted under 35 U.S.C. 154(b) by 251 days.

(21) Appl. No.: 10/905,894

(22) Filed: Jan. 25, 2005

(65) Prior Publication Data

US 2005/0161215 A1 Jul. 28, 2005

Related U.S. Application Data

(63) Continuation-in-part of application No. 10/613,549, filed on Jul. 2, 2003.

(51) Int. Cl.
*G01V 3/00* (2006.01)
(52) U.S. Cl. .............................. 340/853.7; 340/853.3; 340/854.5; 166/242.6
(58) Field of Classification Search ............ 340/853.7, 340/583.1; 166/242.5, 65.1, 380; 175/320; 464/20
See application file for complete search history.

(56) References Cited

U.S. PATENT DOCUMENTS

| | | | |
|---|---|---|---|
| 2,414,718 A | 1/1947 | Cloud | |
| 3,518,608 A | 6/1970 | Papadopoulos | |
| 4,739,325 A | 4/1988 | MacLeod | |
| 4,788,544 A | 11/1988 | Howard | |
| 6,012,015 A | 1/2000 | Tubel | |
| 6,075,461 A | 6/2000 | Smith | |
| 6,144,316 A | 11/2000 | Skinner | |
| 6,160,492 A | 12/2000 | Herman | |
| 6,177,882 B1 | 1/2001 | Ringgenberg et al. | |
| 6,186,249 B1 * | 2/2001 | Bjornstad | 175/320 |
| 6,218,959 B1 | 4/2001 | Smith | |
| 6,252,518 B1 | 6/2001 | Laborde | |
| 6,392,317 B1 | 5/2002 | Hall et al. | |
| 6,670,880 B1 | 12/2003 | Hall et al. | |
| 6,688,396 B2 | 2/2004 | Floerke et al. | |
| 6,717,501 B2 | 4/2004 | Hall et al. | |

(Continued)

OTHER PUBLICATIONS

PCT/US 03/18475, Published Dec. 4, 2003, Applicant Baker Hughes; International Search Report: "Documents Considered to Be Relevant".

*Primary Examiner*—Jeffery Hofsass
*Assistant Examiner*—Sisay Yacob
(74) *Attorney, Agent, or Firm*—Tyson J. Wilde

(57) ABSTRACT

A double shouldered downhole tool connection comprises box and pin connections having mating threads intermediate mating primary and secondary shoulders. The connection further comprises a secondary shoulder component retained in the box connection intermediate a floating component and the primary shoulders. The secondary shoulder component and the pin connection cooperate to transfer a portion of makeup load to the box connection. The downhole tool may be selected from the group consisting of drill pipe, drill collars, production pipe, and reamers. The floating component may be selected from the group consisting of electronics modules, generators, gyroscopes, power sources, and stators. The secondary shoulder component may comprises an interface to the box connection selected from the group consisting of radial grooves, axial grooves, tapered grooves, radial protrusions, axial protrusions, tapered protrusions, shoulders, and threads.

28 Claims, 16 Drawing Sheets

U.S. PATENT DOCUMENTS

| | | | |
|---|---|---|---|
| 6,799,632 B2 | 10/2004 | Hall et al. |
| 6,821,147 B1 | 11/2004 | Hall et al. |
| 6,830,467 B2 | 12/2004 | Hall et al. |
| 6,844,498 B2 | 1/2005 | Hall et al. |
| 6,866,306 B2 * | 3/2005 | Boyle et al. ............ 285/333 |
| 6,888,473 B1 | 5/2005 | Hall et al. |
| 6,913,093 B2 | 7/2005 | Hall et al. |
| 6,929,493 B2 | 8/2005 | Hall et al. |
| 6,945,802 B2 | 9/2005 | Hall et al. |
| 2004/0039466 A1 | 2/2004 | Lilly et al. |
| 2004/0104797 A1 | 6/2004 | Hall et al. |
| 2004/0113808 A1 | 6/2004 | Hall et al. |
| 2004/0145492 A1 | 7/2004 | Hall et al. |
| 2004/0150532 A1 | 8/2004 | Hall et al. |
| 2004/0164833 A1 | 8/2004 | Hall et al. |
| 2004/0164838 A1 | 8/2004 | Hall et al. |
| 2004/0216847 A1 | 11/2004 | Hall et al. |
| 2004/0244916 A1 | 12/2004 | Hall et al. |
| 2004/0244964 A1 | 12/2004 | Hall et al. |
| 2004/0246142 A1 | 12/2004 | Hall et al. |
| 2005/0001735 A1 | 1/2005 | Hall et al. |
| 2005/0001736 A1 | 1/2005 | Hall et al. |
| 2005/0001738 A1 | 1/2005 | Hall et al. |
| 2005/0035375 A1 | 2/2005 | Hall et al. |
| 2005/0035874 A1 | 2/2005 | Hall et al. |
| 2005/0035876 A1 | 2/2005 | Hall et al. |
| 2005/0036507 A1 | 2/2005 | Hall et al. |
| 2005/0039912 A1 | 2/2005 | Hall et al. |
| 2005/0045339 A1 | 3/2005 | Hall et al. |
| 2005/0046586 A1 | 3/2005 | Hall et al. |
| 2005/0046590 A1 | 3/2005 | Hall et al. |
| 2005/0067159 A1 | 3/2005 | Hall et al. |
| 2005/0070144 A1 | 3/2005 | Hall et al.. |
| 2005/0082092 A1 | 4/2005 | Hall et al. |
| 2005/0092499 A1 | 5/2005 | Hall et al. |
| 2005/0093296 A1 | 5/2005 | Hall et al. |
| 2005/0095827 A1 | 5/2005 | Hall et al. |
| 2005/0115717 A1 | 6/2005 | Hall et al. |
| 2005/0145406 A1 | 7/2005 | Hall et al. |
| 2005/0150653 A1 | 7/2005 | Hall et al. |
| 2005/0161215 A1 | 7/2005 | Hall et al. |
| 2005/0173128 A1 | 8/2005 | Hall et al. |
| 2005/0212530 A1 | 9/2005 | Hall et al. |
| 2005/0238160 A1 | 10/2005 | Hall et al. |

* cited by examiner ized. For what are further nee...

DOWNHOLE TOOL

CROSS REFERENCE TO RELATED APPLICATIONS

The present application is a continuation-in-part of U.S. patent application Ser. No. 10/613,549 to Hall et, al. filed on Jul. 2, 2003, which is herein incorporated by reference for all that it discloses.

FEDERAL SPONSORSHIP

This invention was made with government support under Contract No. DE-FC26-01NT41229 awarded by the U.S. Department of Energy. The government has certain rights in the invention.

BACKGROUND OF THE INVENTION

This invention relates to oil and gas drilling, and more particularly to apparatus and methods for reliably transmitting information between downhole drilling components.

The need for signal repeaters to counteract signal loss encountered when transmitting data from downhole components to the earth's surface is known or has been suggested. Nevertheless, in downhole telemetry systems transmitting data on wires or cables integrated directly into the drill string, few if any useable implementations are known for repeating and amplifying data signals. The following references teach repeaters that are used in wireless electromagnetic or acoustic wave transmission systems, and are not applicable to wired solutions. Furthermore, none of the references address all of the challenges, such as cable routing from the repeater up and down the drill string, that are inherent in wired solutions.

U.S. Pat. No. 6,218,959 issued Apr. 17, 2001 to Smith describes a system and method of fail-safe communication of information transmitted in the form of electromagnetic wave fronts that propagate through the earth between surface equipment and downhole components. The system comprises two or more repeaters disposed within a well bore such that the two repeaters receive each signal carrying the telemetered information. The repeater that is farther from the source includes a memory device that stores information carried in the signal. A timer device, in the repeater that is farther from the source, triggers the retransmission of the information after a predetermined time period, unless the repeater that is farther from the source has detected a signal carrying the information, generated by the repeater, that is closer to the source.

U.S. Pat. No. 6,177,882 issued Jan. 23, 2001 to Ringgenberg et. al discloses downhole repeaters that utilize electromagnetic and acoustic waves to retransmit signals carrying information and methods for use of the same. The repeaters and methods provide for real-time communication between downhole equipment and the surface, and for the telemetering of information and commands from the surface to downhole tools disposed in a well using both electromagnetic and acoustic waves to carry information. The repeaters and methods detect and amplify signals carrying information at various depths in the well bore, thereby alleviating signal attenuation.

U.S. Pat. No. 6,160,492 issued Dec. 12, 2000 to Herman discloses an electromagnetic telemetry system for changing the operational state of a downhole device. The system comprises an electromagnetic transmitter disposed in a first well bore that transmits a command signal. An electromagnetic repeater disposed in a second well bore receives the command signal and retransmits the command signal to an electromagnetic receiver disposed in a third well bore that is remote from the first well bore. The electromagnetic receiver is operably connected to the downhole device such that the command signal received from the electromagnetic repeater is used to prompt the downhole device to change operational states.

U.S. Pat. No. 6,144,316 issued Nov. 7, 2000 to Skinner discloses an electromagnetic and acoustic signal repeater for communicating information between surface equipment and downhole equipment. The repeater comprises an electromagnetic receiver and an acoustic receiver for respectively receiving and transforming electromagnetic input signals and acoustic input signals into electrical signals that are processed and amplified by an electronics package. The electronics package generates an electrical output signal that is forwarded to an electromagnetic transmitter and an acoustic transmitter for generating an electromagnetic output signal that is radiated into the earth and an acoustic output signal that is acoustically transmitted.

U.S. Pat. No. 6,075,461 issued Jun. 13, 2000 to Smith discloses an apparatus, method and system for communicating information between downhole equipment and surface equipment. An electromagnetic signal repeater apparatus comprises a housing that is securably mountable to the exterior of a pipe string disposed in a well bore. The housing includes first and second housing subassemblies. The first housing subassembly is electrically isolated from the second housing subassembly by a gap subassembly having a length that is at least two times the diameter of the housing. The first housing subassembly is electrically isolated from the pipe string and is secured thereto with a nonconductive strap. The second housing subassembly is electrically coupled with the pipe string and is secured thereto with a conductive strap. An electronics package and a battery are disposed within the housing. The electronics package receives, processes, and retransmits the information being communicated between the downhole equipment and the surface equipment via electromagnetic waves.

In view of the foregoing, what are needed are apparatus and methods providing signal amplification in high-speed downhole telemetry systems that transmit data using cables or wires directly integrated into the drill string.

What are further needed are apparatus and methods to seal electronics of the repeater from the surrounding environment, while providing routing of cables to and from the repeater traveling uphole and downhole.

It would be a further advance to provide apparatus and methods that not only repeat or amplify a signal, but could also gather data from various sensors such as inclinometers, pressure transducers, thermocouples, accelerometers, imaging devices, seismic devices, and the like, as well as provide control signals to various of these device to control them remotely.

BRIEF SUMMARY OF THE INVENTION

A double shouldered downhole tool connection comprises box and pin connections having mating threads intermediate mating primary and secondary shoulders. The connection further comprises a secondary shoulder component retained in the box connection intermediate a floating component and the primary shoulders. The secondary shoulder component and the pin connection cooperate to transfer a portion of makeup load to the box connection. The downhole tool may be selected from the group consisting of drill pipe, drill collars, production pipe, and reamers. The floating component may be selected from the group consisting of electronics modules, generators, gyroscopes, power sources, and stators. Further the floating component may comprise electronic components selected from the group consisting of signal filtering circuitry, signal error checking circuitry, device control circuitry, modems, digital processors, optical regenerators, optical transmitters, optical receivers, repeater circuitry, sensors, routers, switches, memory, amplifiers, clock sources, data compression circuitry, data rate adjustment circuitry, piezoelectric devices, magnetostrictive devices, gauges, wireless transceivers, digital/optical converters, analog/optical converters, digital/analog converters, and microcontrollers.

The stresses experienced by a downhole tool string may cause damage to the equipment used downhole; therefore, it may be useful to have a floating component which is free of the normal loads experienced by the downhole tool string. The floating component may be separated from the secondary shoulder component by at least 0.01 mm. A portion of the floating component may be in physical contact with the downhole tool, which may be useful to complete electric circuits between the floating component and the downhole tool. The floating component may comprise an O-ring disposed within a recess in the floating component.

An insert may be located in the bore of the downhole tool and may be adjacent to the secondary shoulder component. The insert may contact an end of the floating component. A biasing element may be intermediate an internal shoulder of the pin connection and the insert, wherein the biasing element may urge the insert towards the floating component. The insert may comprise a first communications element adjacent a second communications element in the floating component. The first communications element may be adapted to relay power or data between the floating component and a first conductor. The downhole tool may comprise a third communications element adjacent a fourth communication element in another end of the floating component. The third communications element may be adapted to relay power or data between the floating component and a second conductor. The communications elements may be selected from the group consisting of inductive couplers, direct electrical contacts, optic couplers, and combinations thereof. The first and second conductors may be selected from the group consisting of coaxial cables, copper wires, optical fibers, triaxial cables, and twisted pairs of wires.

The secondary shoulder component may comprises an interface to the box connection selected from the group consisting of radial grooves, axial grooves, tapered grooves, radial protrusions, axial protrusions, tapered protrusions, shoulders, and threads. The secondary shoulder may be segmented for aiding in the insertion of the secondary shoulder in the downhole tool connection.

The secondary shoulder may comprise a tapered internal surface, which may aid in distributing the makeup load. The pin and box connection may comprise a taper that is less than 5 degrees. The pin connection may comprise a pin thread and the box connection may comprise a box thread. The pin and box threads may comprise stress relief grooves. The box and pin threads may also comprise thread roots comprising at least two tapers.

DETAILED DESCRIPTION OF THE INVENTION AND THE PREFERRED EMBODIMENT

Figure 1:
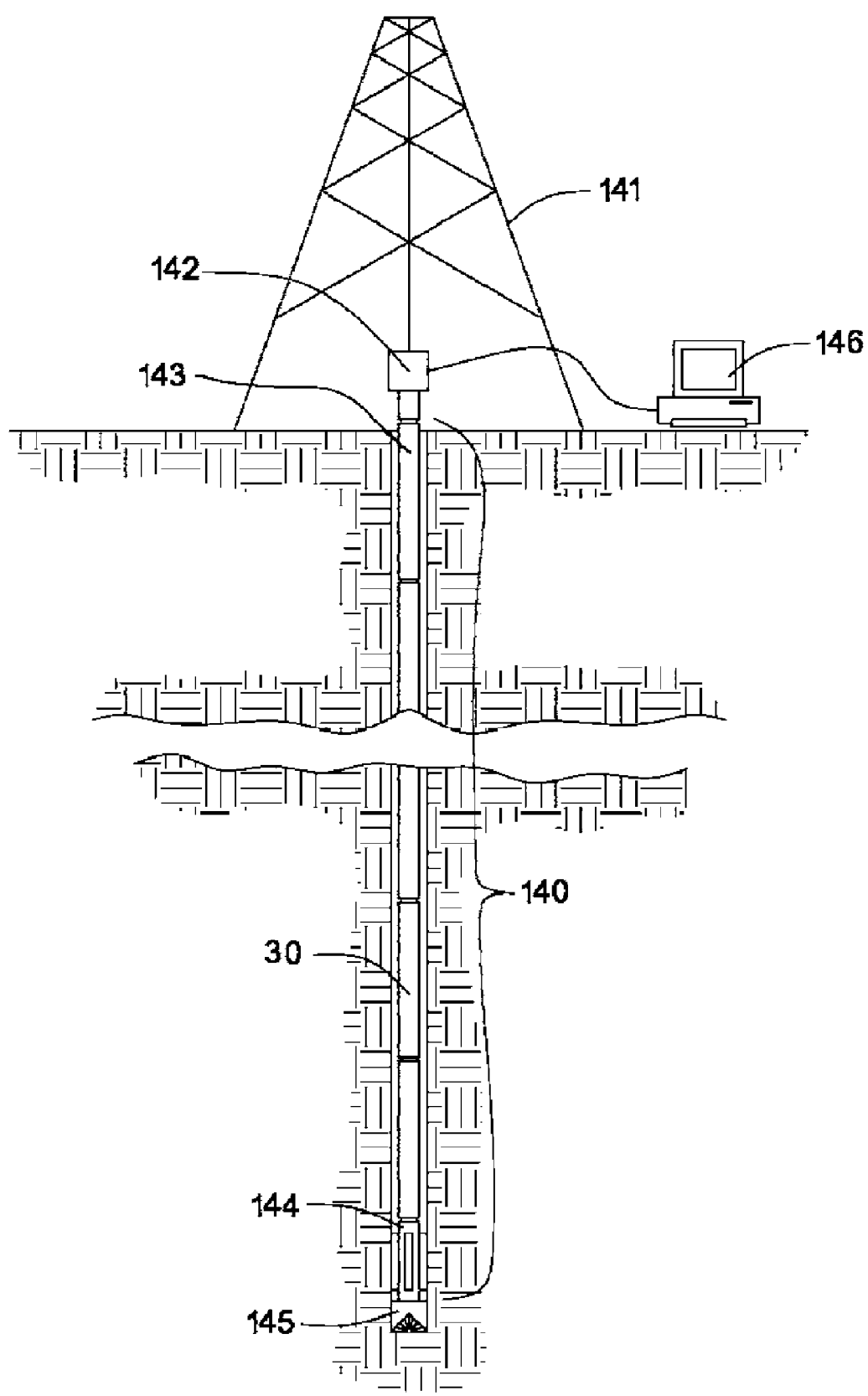
FIG. 1 is a perspective view of a drill string suspended in a bore hole.

FIG. 1 shows a drill string 140 suspended by a derrick 141. A bottom-hole assembly 144 is located at the bottom of a bore hole 143 and comprises a drill bit 145. As the drill bit 145 rotates downhole the drill string 140 advance further into the earth. The bottom-hole assembly 144 and/or downhole tools 30, such as drill pipes, may comprises data acquisition devices (not shown) which may gather data. The data may be sent to the surface via a transmission system to a data swivel 142. The data swivel 142 may send the data to the surface equipment 146. Further, the surface equipment 146 may send data and/or power to downhole tools 30 and/or the bottom-hole assembly 144.

Figure 2:
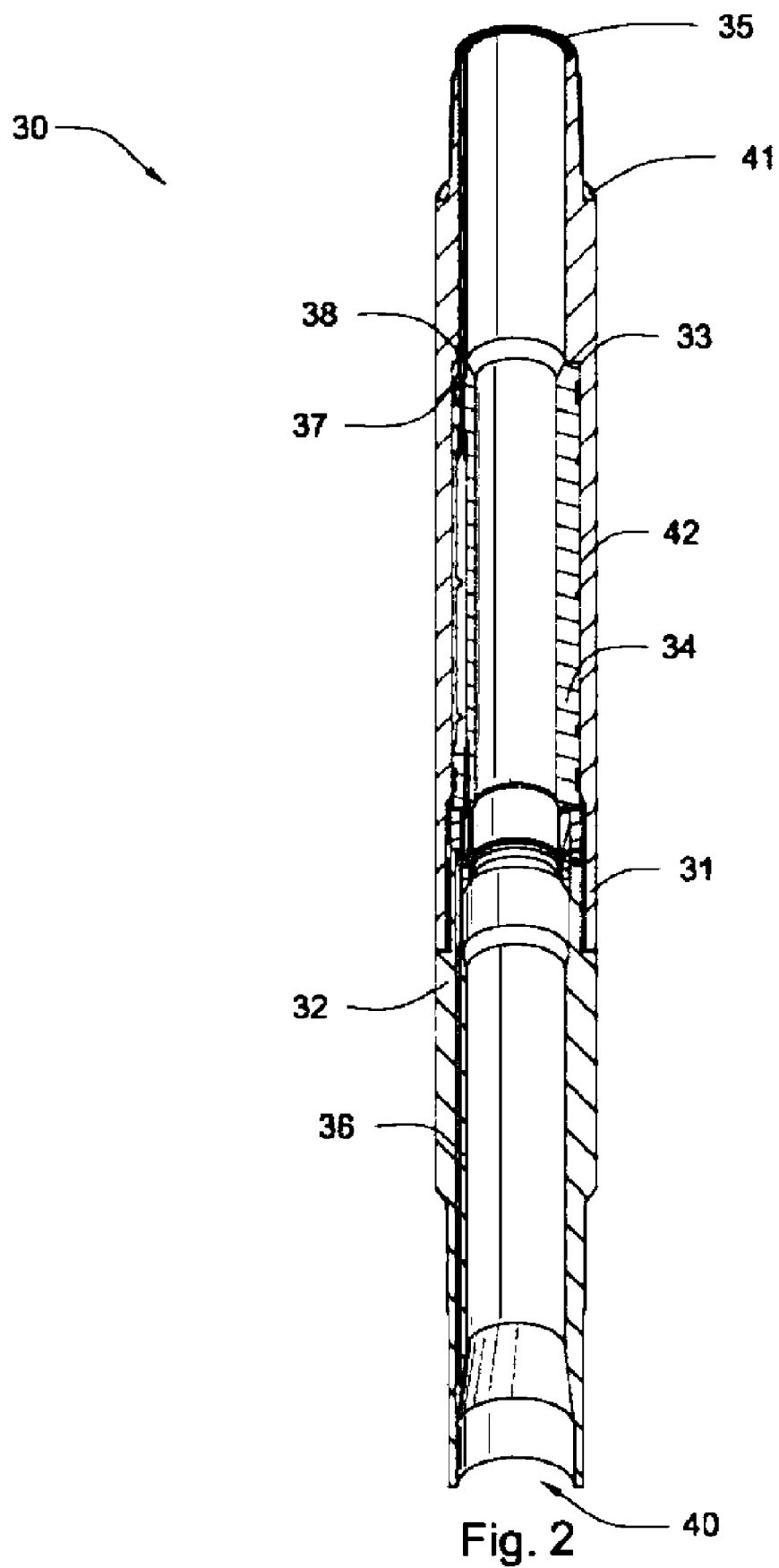
FIG. 2 is a cross sectional view of a downhole tool comprising a floating component.

FIG. 2 is a cross sectional view of a downhole tool 30 comprising a box connection 31 and a pin connection 32. Box connection 31 and pin connection 32 are located in a mid-body section of the downhole tool 30. The downhole tool 30 also comprises a box end 40 and a pin end 35 which are located at the ends of the downhole tool 30. The downhole tool 30 may be selected from the group consisting of drill pipe, drill collars, production pipe, wireline tools, and reamers. The box connection 31 of the downhole tool 30 comprises a receptacle 33. Disposed within the receptacle 33 is a floating component 34, that may be selected from the group consisting of electronic modules, gyroscopes, generators, power sources and stators. Preferably, the floating component 34 is a hollow cylindrically shaped member with a pass through bore that is at least as large as the smallest bore of the tool joint. A downhole tool 30 that comprises a receptacle 33 for a floating component 34 maybe useful in downhole applications where equipment may be damaged by mechanical stresses normally experienced in a downhole tool string. A floating component may operate within the receptacle of the downhole component without experiencing normal downhole stresses.

Preferably the floating component 34 is adapted to communicate with a downhole network, such as a network as described in U.S. Ser. application No. 10/710,790 to Hall, et al. filed on Aug. 3, 2004, which is herein incorporated for all that it discloses. Suitable downhole tool strings adapted to incorporate data transmission systems are described in U.S. Pat. No. 6,670,880 to Hall, et al.; U.S. Pat. No. 6,641,434 to Boyle, et al.; and U.S. Pat. No. 6,688,396 to Floerke, et al. U.S. Pat. Nos. 6,670,880; 6,641,343; and 6,688,396 are all incorporated herein by reference for all that they disclose.

The pin connection 31 of the downhole tool 30 comprises a first conductor 36 intermediate the floating component 34 and an end 40 of the downhole tool 30. The box connection 32 comprises a second conductor 41 intermediate the floating component 34 and another end 35 of the downhole tool 30. The first and second conductor 36, 41 may be selected from the group consisting of coaxial cables, copper wires, optical fiber cables, triaxial cables, and twisted pairs of wire. The ends 35, 40 of the downhole tool 30 are adapted to communicate with the rest of the downhole network. First and second communications elements 45, 44 (shown in FIG. 3) allow the transfer of power and/or data between the first conductor 36 and the floating component 34. Third and fourth communications elements 37, 38 allow for transfer of power and/or data between the floating component 34 and the second conductor 41. The communications element 37, 38, 44, 45, may be selected from the group consisting of inductive couplers, direct electrical contacts, optical couplers, and combinations thereof. In some embodiments, the downhole tool 30 may complete an electric circuit as the return path between the first and/or second conductors 36, 41. In such embodiments the floating component 34 may need to be in electrical contact with the wall 42 of the downhole tool 30. During drilling and oil exploration, a drill string may bend creating a gap between the floating component 34 and the downhole tool's wall 42. Additionally, due to high temperatures downhole the downhole tool 30 may expand at a greater rate than the floating component 34 which may also interfere with a connection between the floating component 34 and the wall 42 of the downhole tool 30. A spring 49 (shown in FIG. 3) may be used to bias an end, portion, and/or entire floating component 34 towards the wall 42 of the downhole tool 30. Further, the spring 49 may be electrically conductive and may act as a ground by providing an electrical connection between the downhole tool 30 and the floating component 34.

Figure 3:
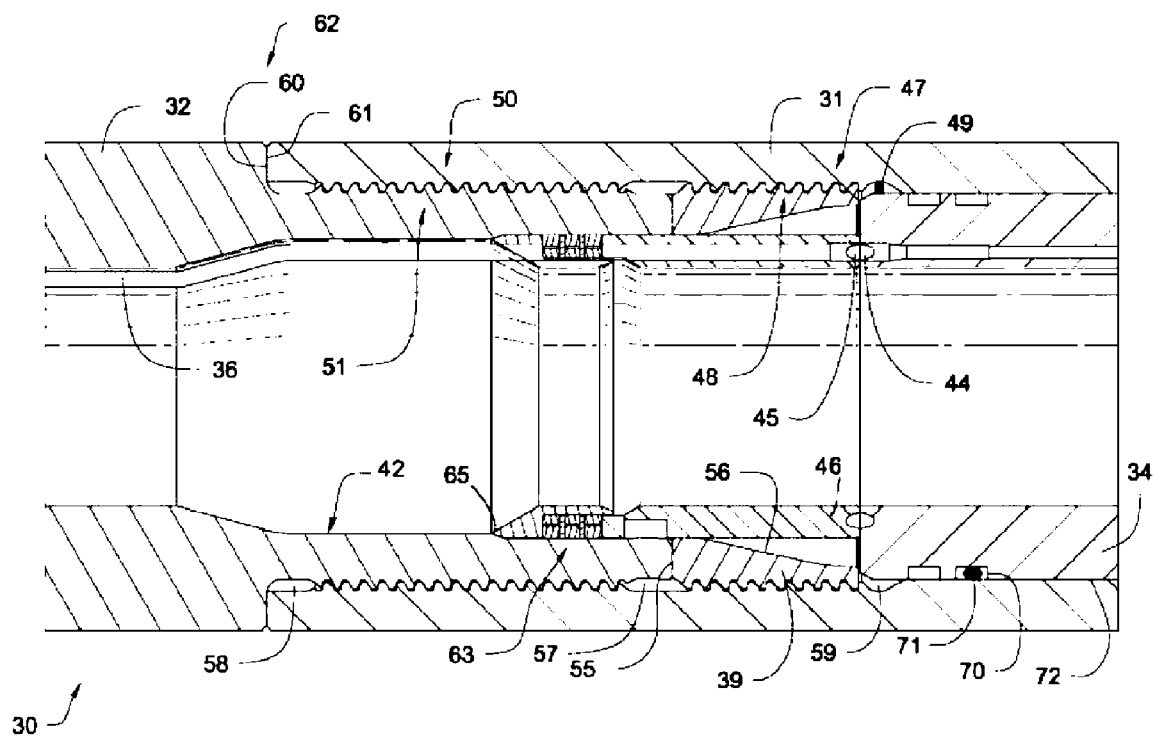
FIG. 3 is a cross sectional view of a downhole tool connection.

FIG. 3 is a cross sectional view of the box and pin connections 31, 32 of the downhole tool 30. The connection may be in the middle of the body of the downhole tool 30, or alternatively situated near one of the ends 35, 40 (shown in FIG. 2) of the downhole tool 30. The box connection 31 comprises a box thread 50 and a secondary shoulder interface 47. The secondary shoulder interface as shown in FIG. 3 comprises a plurality of radial grooves. The pin connection 32 of the downhole tool 30 comprises a pin thread 51 and a secondary shoulder 55. The secondary shoulder component 39 is adjacent both the secondary shoulder 55 of the pin connection 32 and the secondary shoulder interface 47 of the box connection 31. The secondary shoulder component 39 comprises a box connection interface 48 interfacing the secondary shoulder interface 47. The secondary shoulder interface as shown in FIG. 3 comprises a plurality of radial protrusions. The secondary shoulder component 39 may physically contact the secondary shoulder 55 of the pin connection 32. Preferably, the secondary shoulder component 39 and the floating component 34 are separated by at least 0.01 mm. An insert 46 is located within an internal surface 56 of the secondary shoulder component 39. The secondary shoulder component 39 may have a tapered internal surface 56.

The floating component 34 may be in physical contact with the insert 46. The insert 46 may comprise the first communications element 45 and the floating component 34 may comprise the second communications element 44. A biasing element 63 may urge the insert 46 to towards the floating component 34, so the first and second communications elements 45, 44 physically contact. The biasing effect may be accomplished by providing a spring adjacent an internal shoulder 65 in the wall 42 of the pin connection 32. The spring may be connected to the insert 46 and may push the insert 46 towards the floating component 39.

The first communications element 45 is connected to the first conductor 36. The first conductor 36 may be connected to another communications element (not shown) in the end 35 of the downhole tool 30 (shown in FIG. 2). Thus data and/or power may be transmitted from the end 40 of the downhole tool 30 to another end 35 of the downhole tool 30 or vice versa. Further the signal may be modified in the floating component 34 as it passes through the floating component 34. A signal may originate in the floating component 34 and be passed to a downhole network either through one end 40 of the downhole tool 30 or through another end 35 of the downhole tool 30.

The box connection 31 and the pin connection 32 may comprise a taper less than 5 degrees. The pin and box connections 31, 32 may comprise a zero taper. A tapered box connection 31 and a tapered pin connection 32 over 5 degrees may be difficult to manufacture with the thickness of the wall 42 as shown in FIG. 3, although a thicker wall 42 may be used and a taper greater than 5 degrees is achievable. The pin thread 51 and the box thread 50 may comprise a double thread start.

A first stress relief groove 57 may be located in the box connection 52 intermediate the secondary shoulder interface 47 and the box thread 50. It is believed that the first stress relief groove 57 allows tension built up in the pin and box threads 51, 50 to be released. Further, a second stress relief groove 58 intermediate a primary shoulder 60 of the box connection 31 and the box threads 50 may relieve tension built up from the mechanical seal 62 of the primary shoulder 60 of the box connection 31 and a primary shoulder 61 of the pin connection 32. Further a third stress relief groove 59 located in the box connection 31 adjacent the secondary shoulder interface 47 may relieve tension which may build up between secondary shoulder interface 47 and the box connection interface 48. A spring 49 in the third stress relief groove 59 may electrically connect the floating component 34 to the wall 42 of the downhole tool 30.

The floating component 34 may also comprise at least one radial recess 70 in its outer diameter 72. An elastomeric material 71, such as an O-ring may be disposed within the recess 70 to provide a seal against moisture and lubricants that may come into contact with elements of the floating component 34, such as electrical components.

Figure 4:
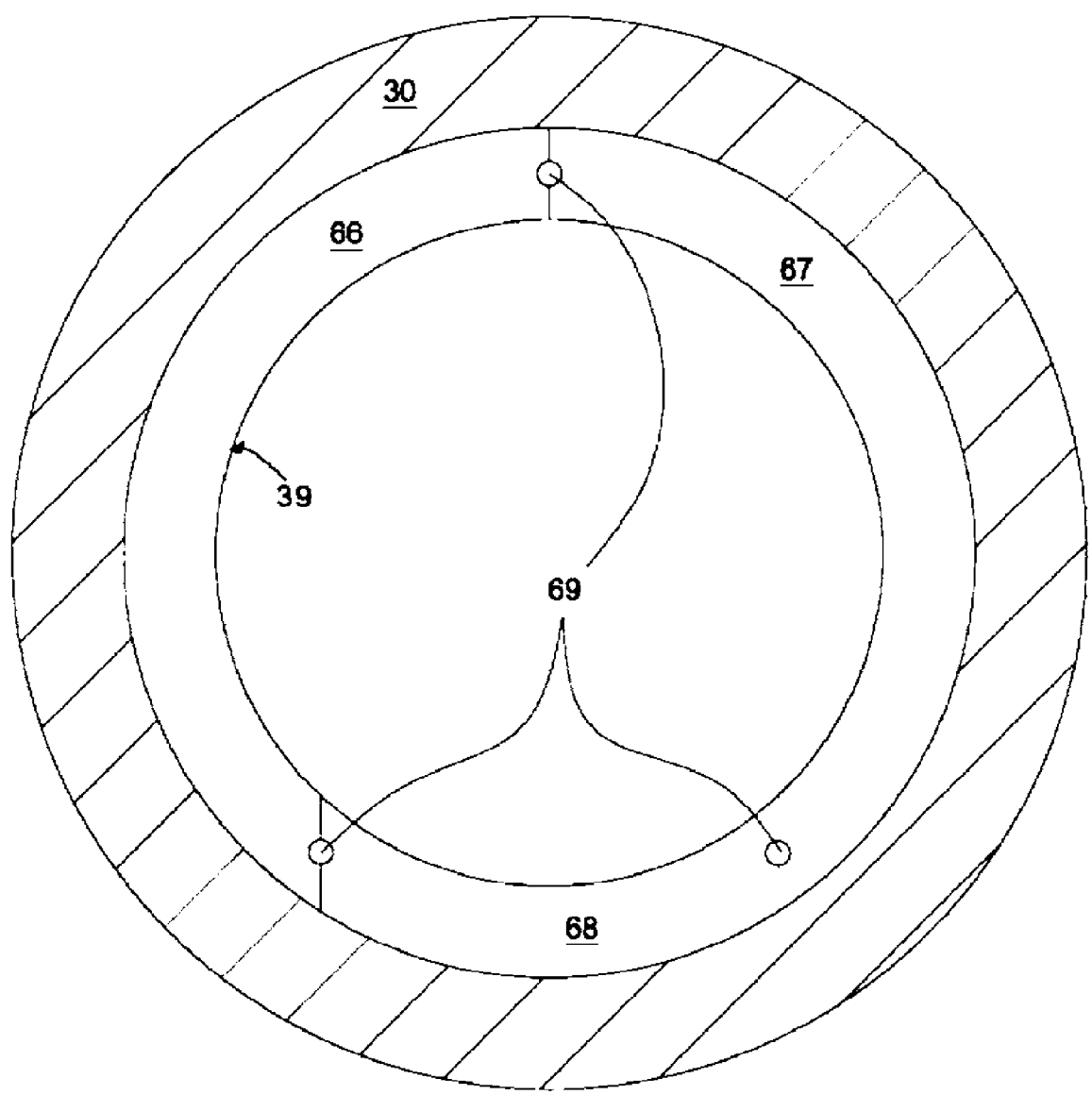
FIG. 4 is a perspective cross sectional view of a secondary shoulder component.

FIG. 4 is a perspective cross sectional view of the secondary shoulder component 39 as shown in FIG. 3. The secondary shoulder components may be press fit, welded, or glued into the downhole tool 30. Since the secondary shoulder component 39 as shown in FIG. 3 comprises radial protrusions to interface with radial grooves in the box connection 31, the secondary shoulder interface 39 can not slide into place by sliding it through the bore of the downhole tool 30. Preferably, the secondary shoulder component 39 comprises at least two segments, such that its box connection interface 48 (as shown in FIG. 3) may be inserted into the secondary shoulder interface 47 (as shown in FIG. 3). The secondary shoulder component of FIG. 4 comprises a first, second, and third segment 66, 67, 68. The first and second segment 66, 67 may be placed adjacent the secondary shoulder interface 47 and the third segment 68 may be fitted in last. Pins 69 may hold the segments 66, 67, 68 together. It may be desirable to remove, inspect, or replace the floating component 34; therefore a segmented secondary shoulder component is useful because the secondary shoulder component 39 may be more easily removed than a welded, glued, or press fitted shoulder, although a permanently placed secondary shoulder component is usable. In certain embodiments of the present invention, the secondary shoulder component 39 is permanently installed in the downhole tool 30 and the floating component 34 may be removed around the permanent secondary shoulder component.

Figure 5:
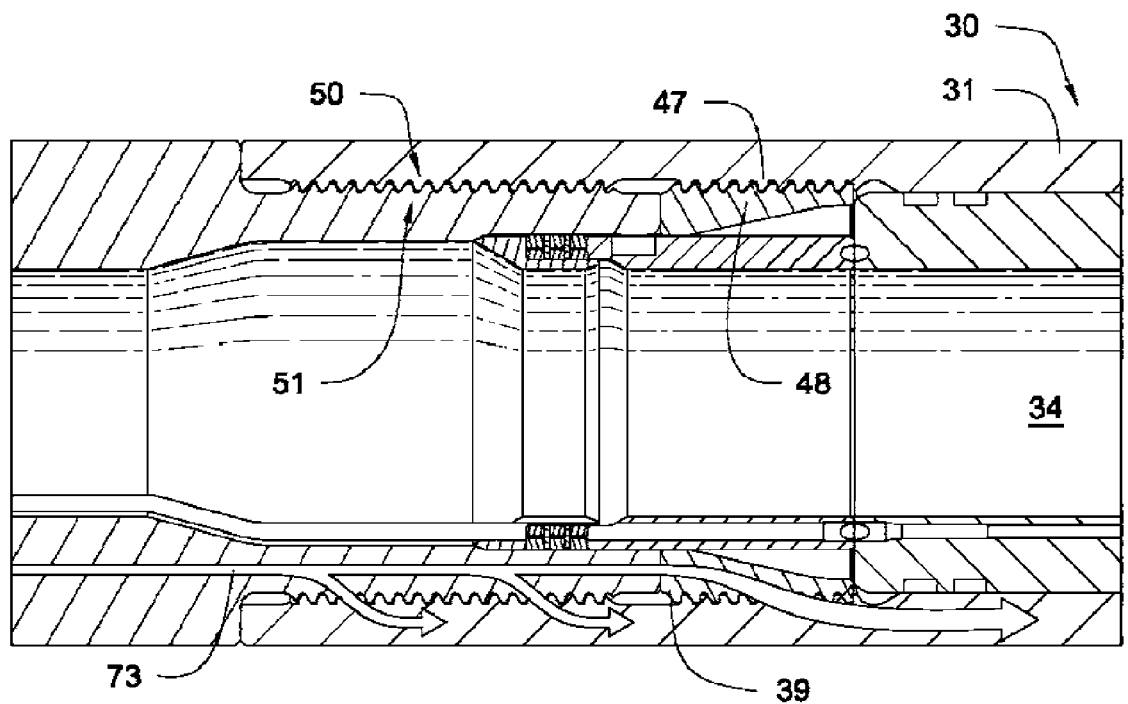
FIG. 5 is a perspective cross sectional view of an embodiment of a secondary shoulder component.

FIG. 5 is a perspective view of a load path 73 in a cross section of the downhole tool 30. The weight of a drill string or other forces creates a load that is distributed through drill string components. Further makeup load puts stress on the downhole tool 30. Additionally, when a portion of a drill string gets stuck during drilling, the kelly or top motor drive may still be turning a top portion of the drill string creating an overload condition which may be felt by the downhole tool 30. The floating component 34 may contain electronic equipment that may be break under a significant load. Preferably, the secondary shoulder component 39 and the floating component 34 are separated by at least 0.01 mm so the secondary shoulder component 39 doesn't mechanically pass the load to the floating component 34, instead the load is passed through the box connection interface 48 of the secondary shoulder component 39 to the secondary shoulder interface 47 of the box connection 31. It is believed, but not wanting to be bound by any theory, that a tapered secondary shoulder component 39 may distribute a load more evenly through multiple secondary shoulder interface 47. It is also believed that a portion of the load path 73 goes through the pin threads 51 to the box threads 50 thereby lessening the load 73 passed through the secondary shoulder component 39.

Figure 6:
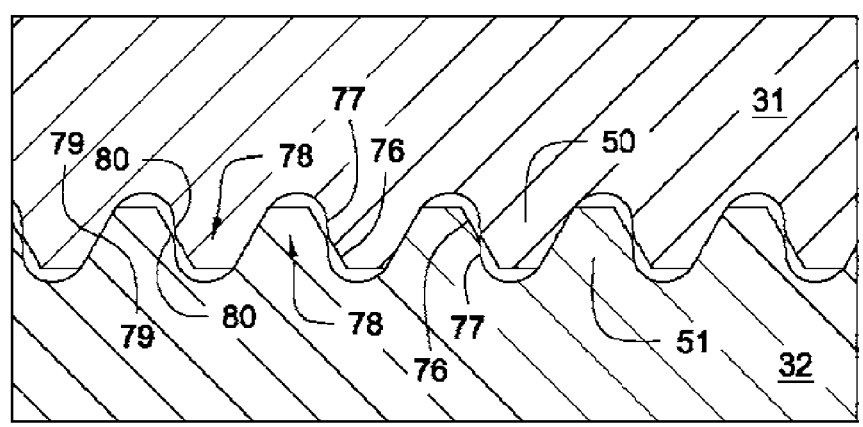
FIG. 6 is a perspective view of a thread root.

FIG. 6 is a cross sectional view of an embodiment of the pin and box threads 51, 50 in the pin and box connections 31, 32. The roots 78 in the box and pin threads 50, 51 comprise an interfacing side 79 and a stress relief side 80. The interfacing sides 79 of both the pin and box threads 51, 50 are in substantial physical contact with each other. A load from the pin connection 31 may be passed to the box connection 32; however, a passing a load from the box connection 32 to the pin connection 31 may be more difficult. The stress relief side 80 of the roots comprises a first and second taper 76, 77. The second taper 77 prevents the stress relief side of both the pin and box threads 51, 50 from making substantial contact with each other. It is believed, that by reducing the substantial contact between the box and pin threads 50, 51 that the stresses that typically build up in threaded connections is minimized.

Figure 7:
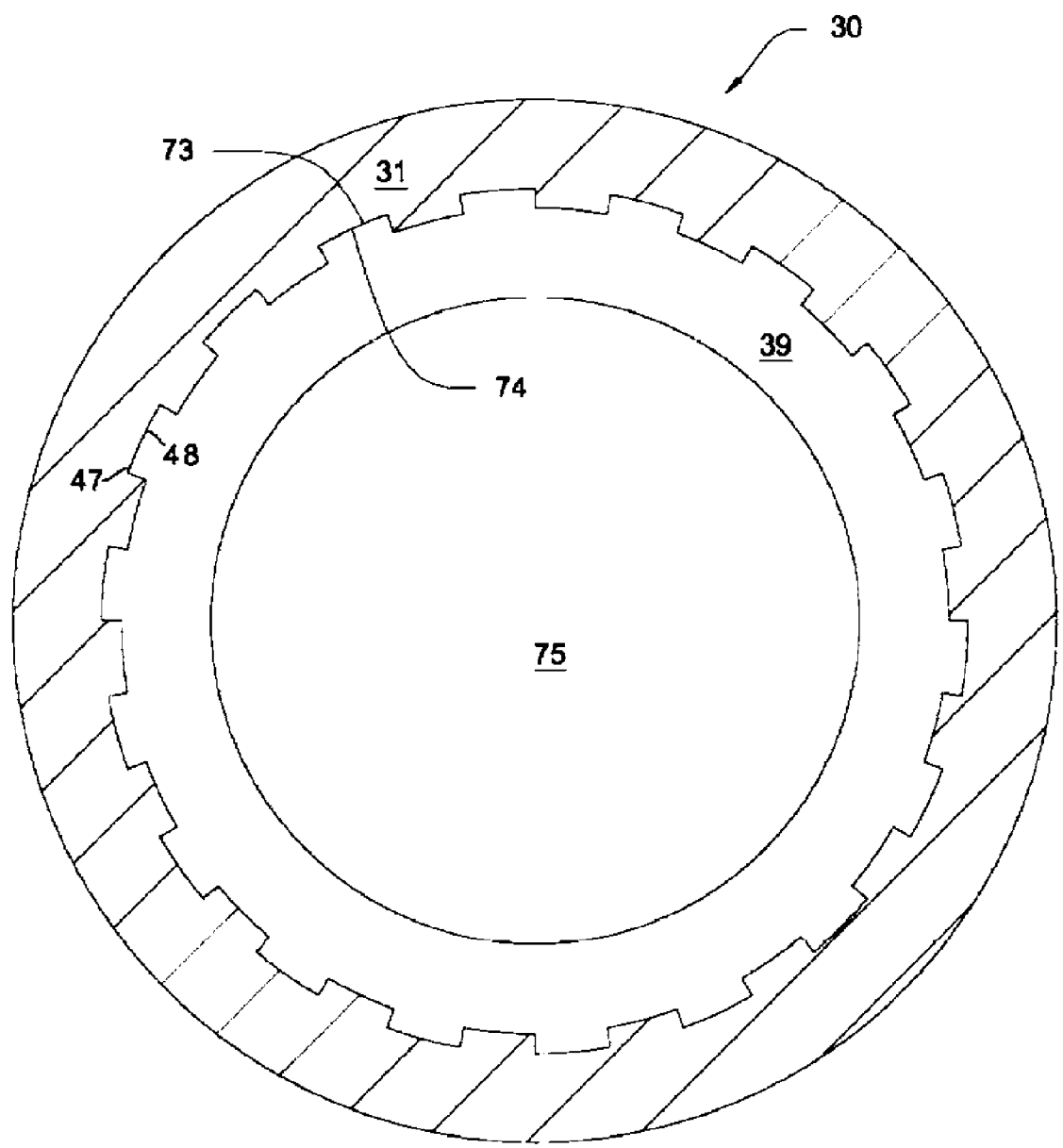
FIG. 7 is a top view of a secondary shoulder component.
Figure 8:
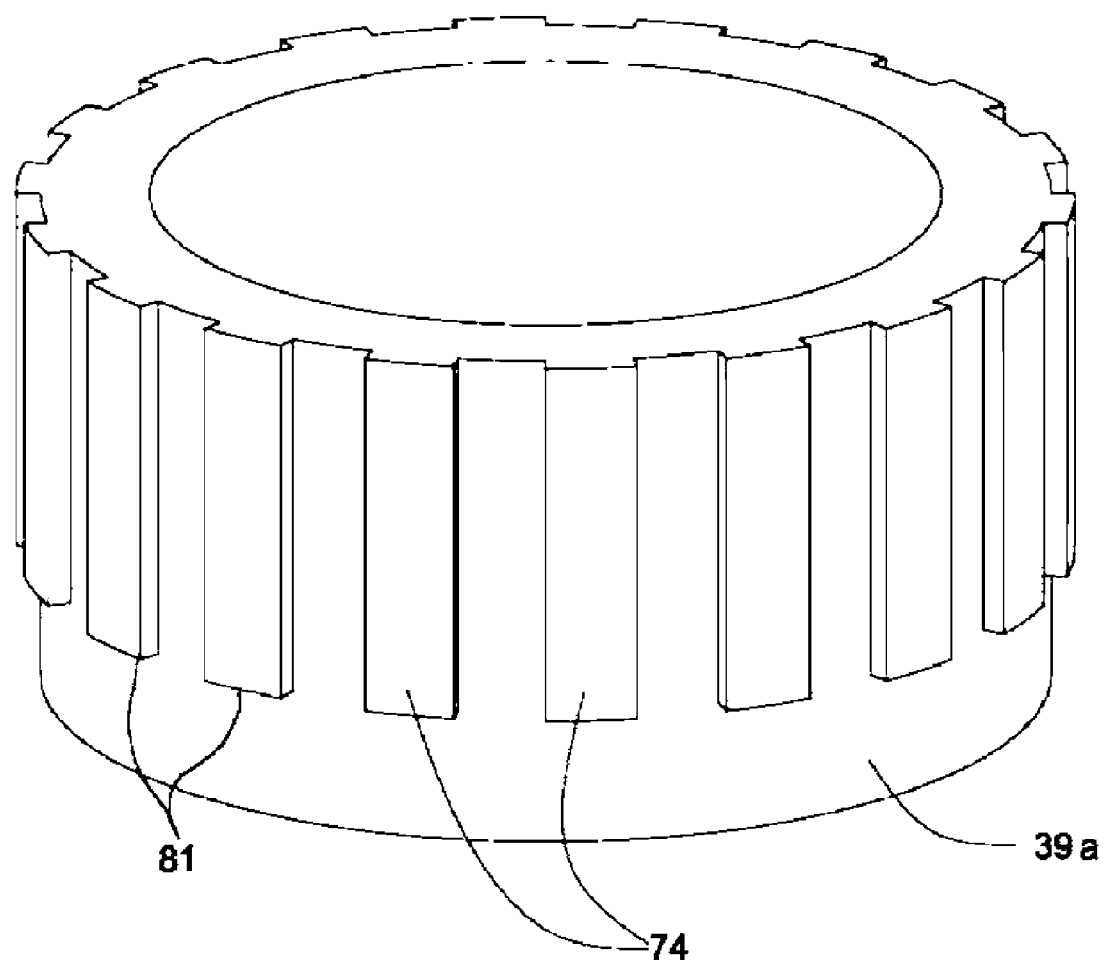
FIG. 8 is a perspective view of an embodiment of a secondary shoulder component.

The secondary shoulder interface 47 may be selected from the group consisting of radial grooves, axial grooves, tapered grooves, radial protrusions, axial protrusions, tapered protrusions, shoulders and threads. Additionally, the box connection interface 48 may be selected from the group consisting of radial grooves, axial grooves, tapered grooves, radial protrusions, axial protrusions, tapered protrusions, shoulders and threads. FIG. 7 is a cross section view of a secondary shoulder component 39 comprising axial protrusions 74 interfacing axial grooves 73 in the box connection 31. The secondary shoulder component 39 may be inserted by sliding the secondary shoulder component 39 through the bore 75 of the downhole tool 30 until it rests in the secondary shoulder interface 47. FIG. 8 is a perspective view of a secondary shoulder component 39a comprising radial protrusions 74. A load from the secondary shoulder may be passed to the box connection at the shoulders 81 of the axial protrusions 74. It should be noted that the term "secondary shoulder 39" used throughout this specification may be any of the embodiments of the secondary shoulders 39a–39f which are depicted in FIG. 8–13.

Figure 9:
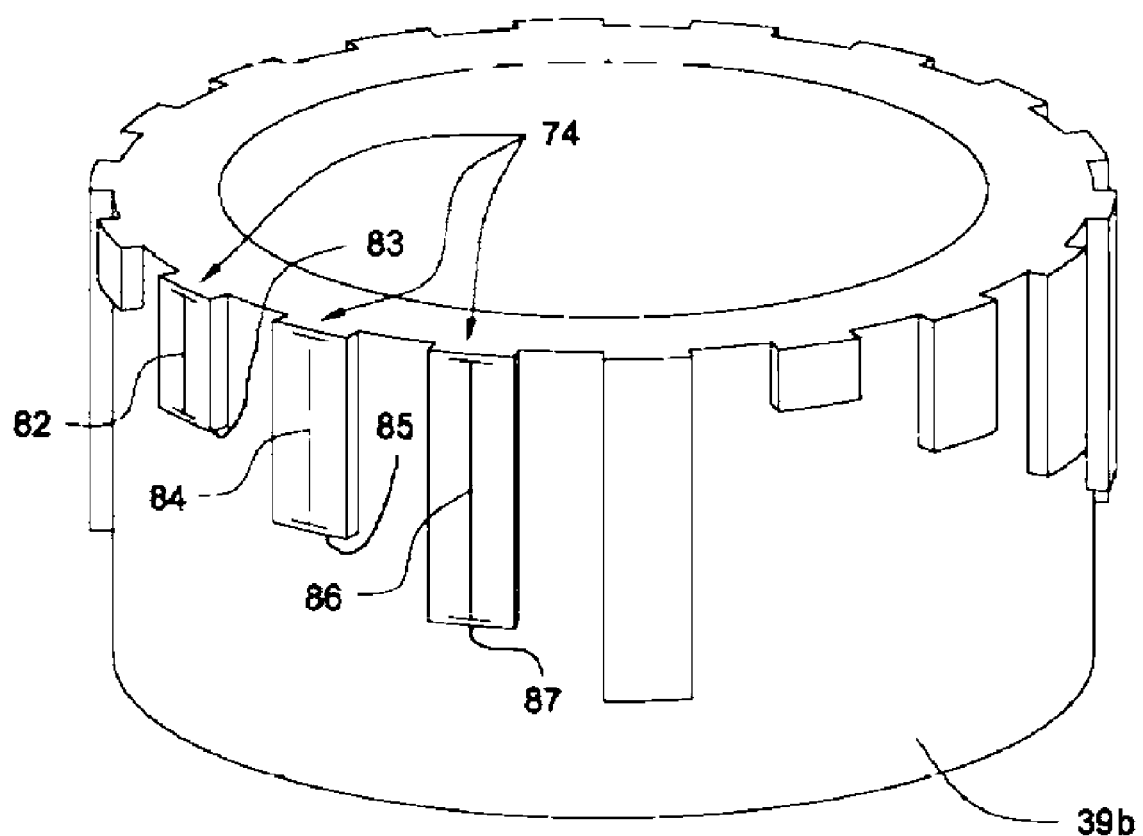
FIG. 9 is a perspective view of a second embodiment of a secondary shoulder component.

FIG. 9 is a perspective view of another embodiment of the secondary shoulder component 39b. The axial protrusions 74 comprises a plurality of lengths 82, 84, 86. A first length 82 may distribute a portion of a load to the box connection 31 at a first location 83. A second length 84 may distribute another portion of a load to the box connection 31 at a second location 85. A third length 86 may pass the load at a third location 87 and so on. A portion of the box connection 31 may be weakened if the entire load is passed to the same portion of the box connection 31. By providing a plurality of lengths 82, 84, 86; the load may be distributed to the box connection 31 throughout the length of the secondary shoulder component 39b.

Figure 10:
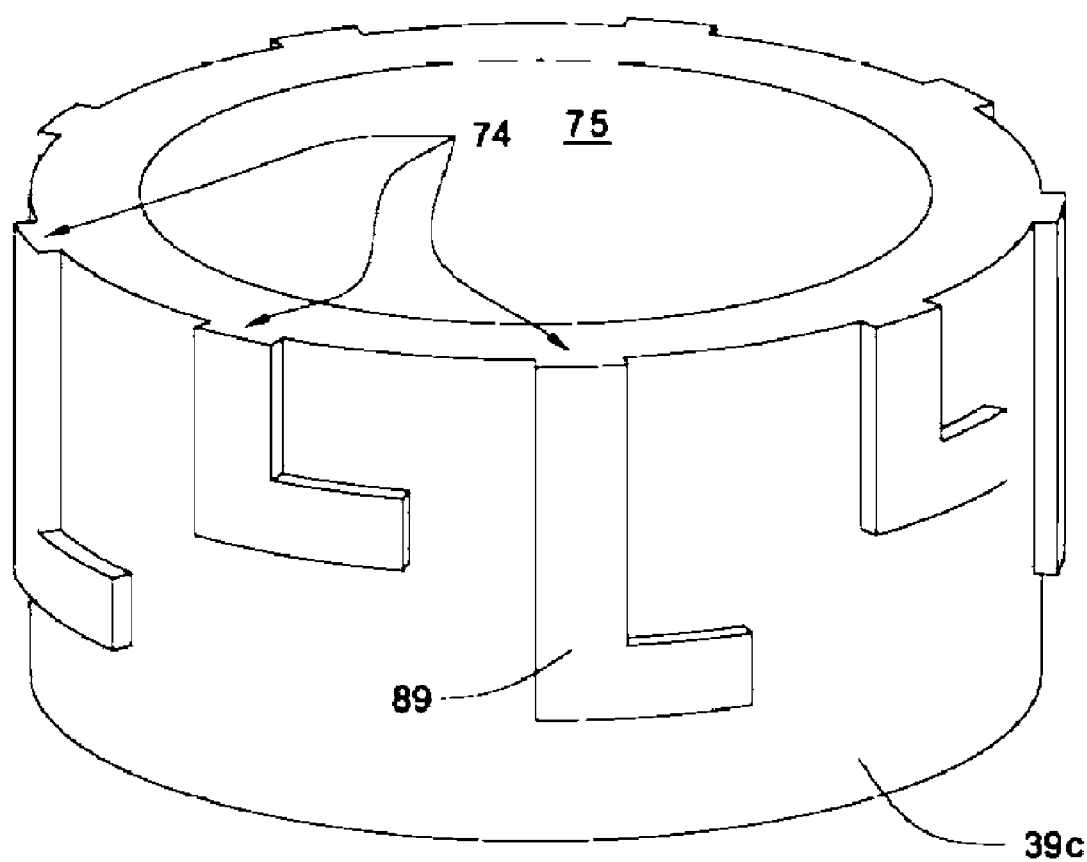
FIG. 10 is a perspective view of a third embodiment of a secondary shoulder component.

FIG. 10 is a perspective view of another embodiment of the secondary shoulder component 39c. In this embodiment, the radial protrusions 74 comprise a plurality of lengths for distribution of the load through the secondary shoulder component 39c. The radial protrusions 74 also comprise a locking section 89. A method of installing the secondary shoulder component 39c comprises inserting the secondary shoulder component 39c through the bore 75 of the downhole tool 30 axially through radial grooves (not shown) in the box connection 31. The next step comprises sliding the secondary shoulder component 39c radially such that the locking section 89 slides into a slot (not shown) in the box connection 31.

Figure 11:
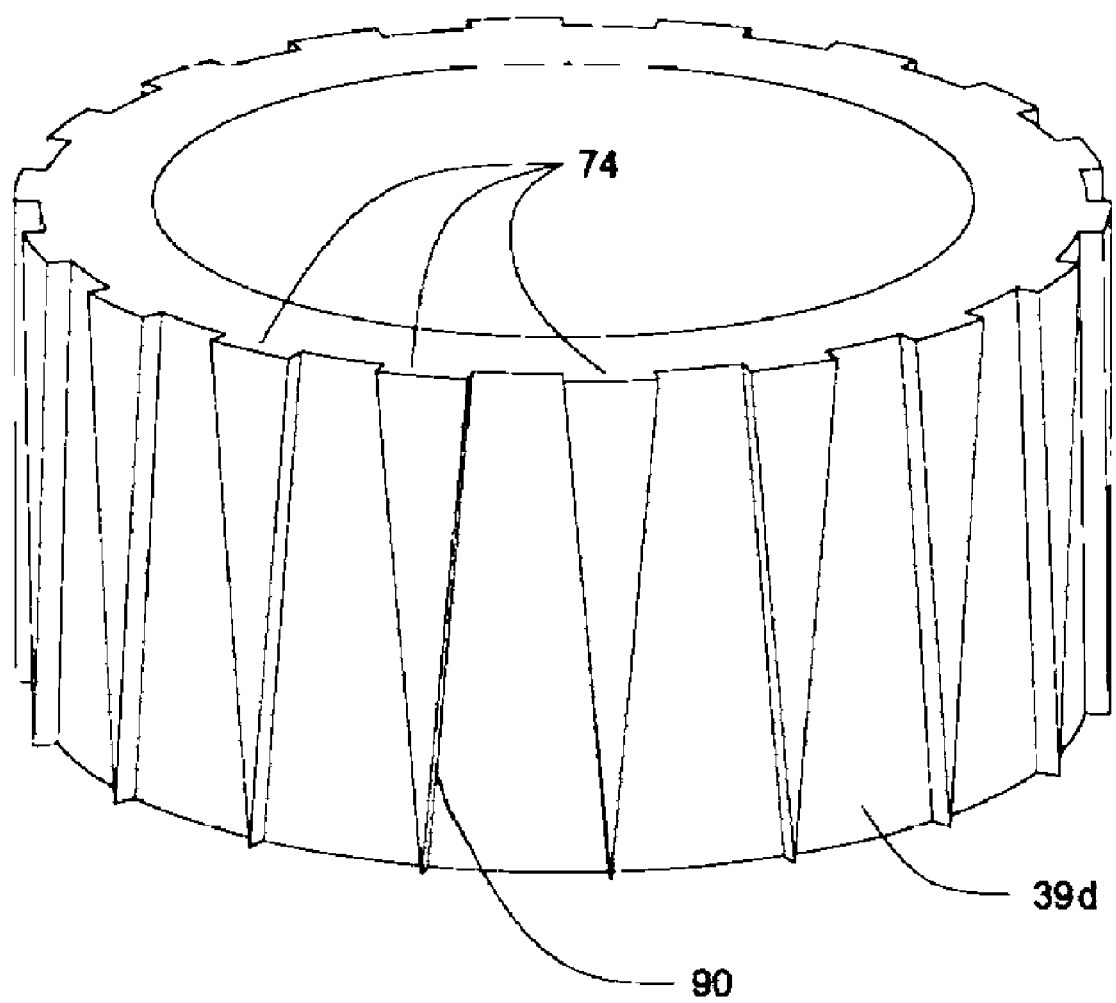
FIG. 11 is a perspective view of a fourth embodiment of a secondary shoulder component.
Figure 12:
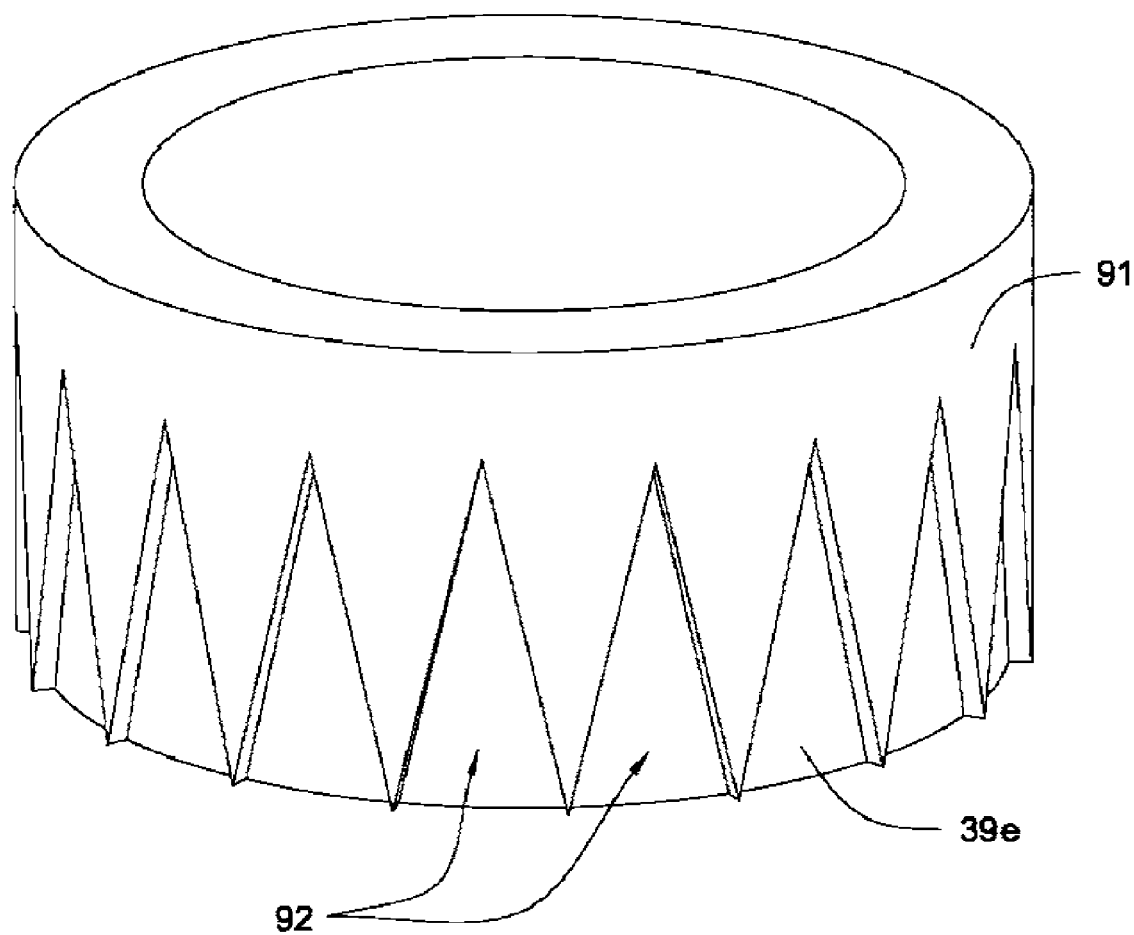
FIG. 12 is a perspective view of a fifth embodiment of a secondary shoulder component.

FIG. 11 is a perspective view of a secondary shoulder component 39d. The secondary shoulder component 39d comprises protrusions 74 with tapered edges 90. A load may be distributed substantially evenly through the tapered edges 90 of the protrusions 74. Cooperating tapered grooves (not shown) may be used in the box connection to absorb the load. FIG. 12 is a perspective of another secondary shoulder component 39e. The component 39e comprises a raised section 91 with triangular slots 92. The triangular slots are for distributing a load with cooperating triangular protrusions (not shown) in the box connection 31.

Figure 13:
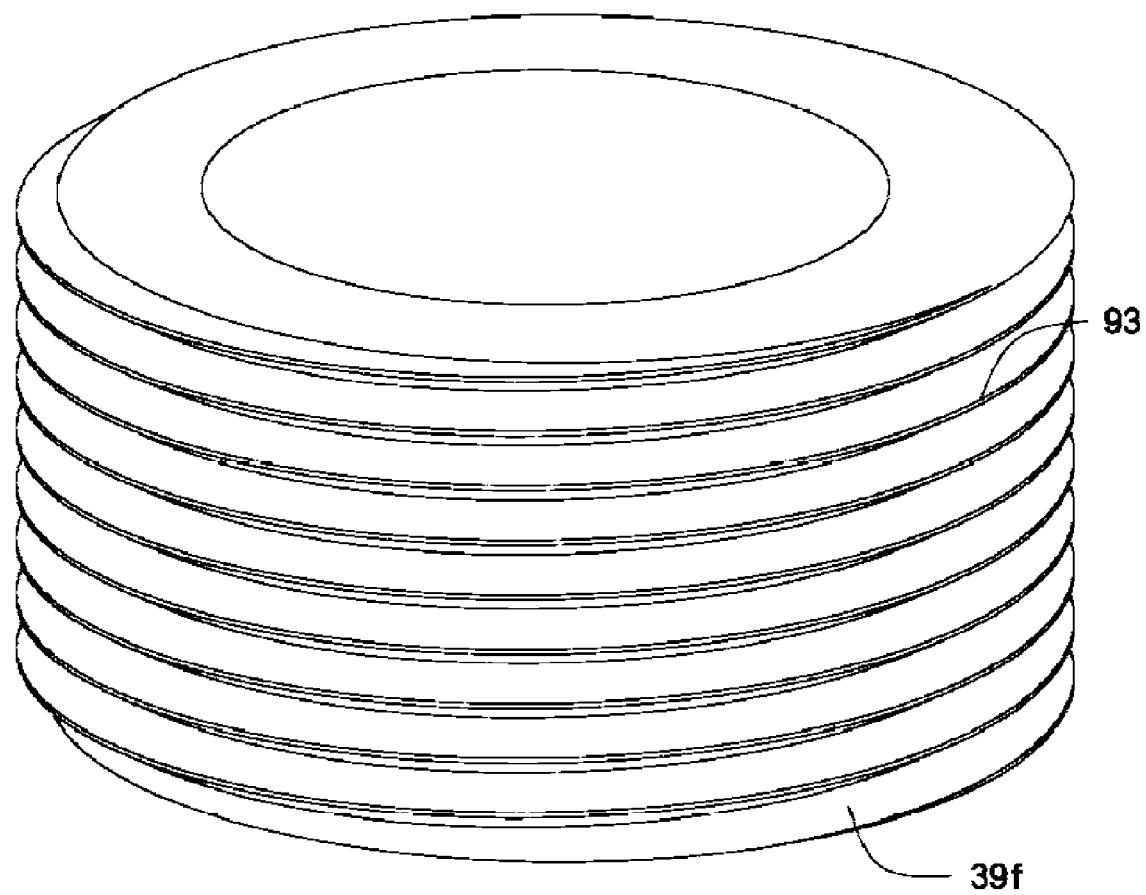
FIG. 13 is a perspective view of a sixth embodiment of a secondary shoulder component.

FIG. 13 is a perspective view of a secondary shoulder component 39f comprising a load interfacing thread 93. The secondary shoulder component 39f may be threaded into place after a floating component 34 is installed into the receptacle 33 (see FIG. 2). Additionally, the bottom of the secondary shoulder component 39f may rest on a shoulder, ledge or protrusion (not shown) in the box connection 31, which may absorb a portion of a load. The load interfacing thread may pass a portion or the entire load to the box connection 31. It would be obvious to anyone of ordinary skill in the art to add variations to the radial grooves, axial grooves, tapered grooves, radial protrusions, axial protrusions, tapered protrusions, slots, shoulders and threads of the secondary shoulder component 39 described in the figures. Further it would be obvious to one of ordinary skill in the art to use the embodiments described herein for the secondary shoulder interface 47 for the box connection interface 48 and vice versa.

Figure 14:
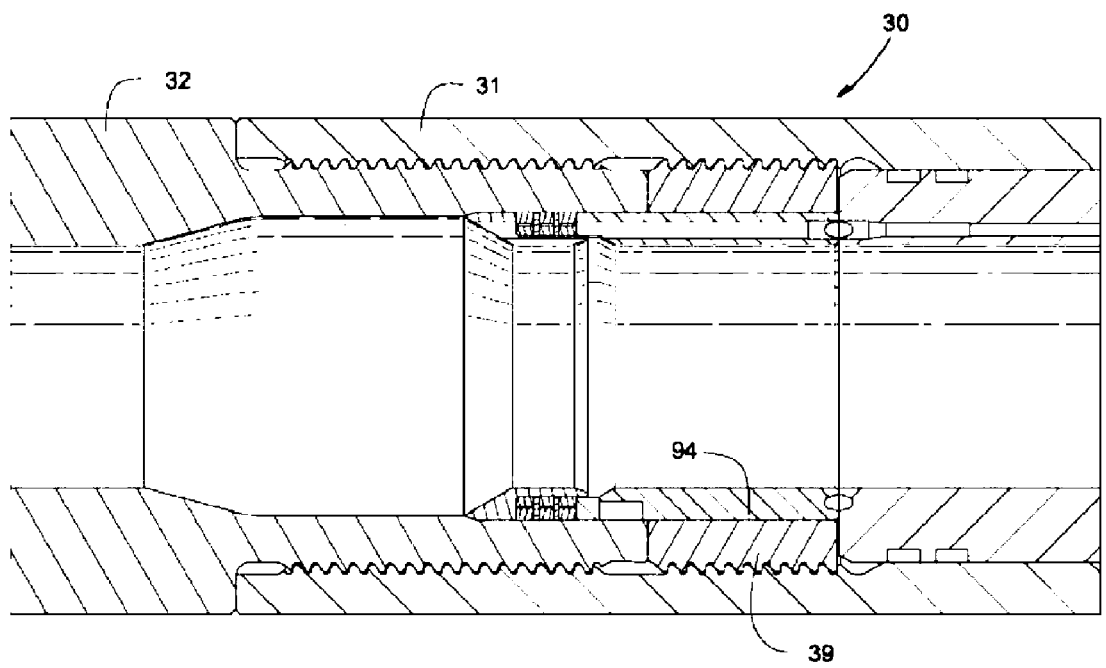
FIG. 14 is a perspective view of a downhole tool connection.
Figure 15:
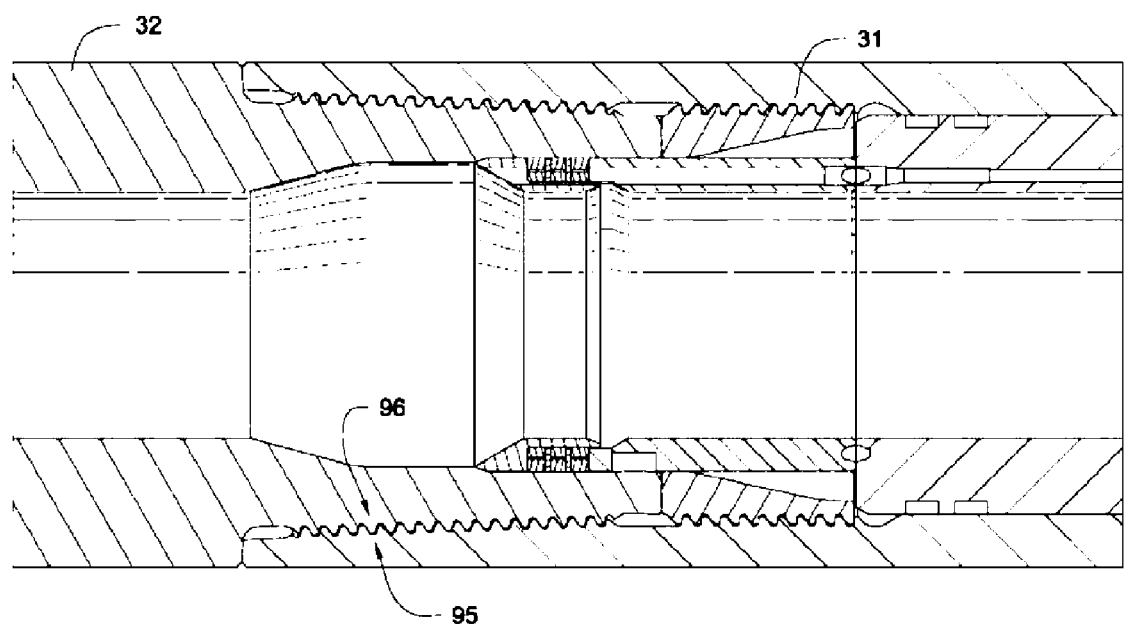
FIG. 15 is a perspective view of a downhole tool connection.

FIG. 14 is a cross section of the pin and box connection 32, 31 of the downhole tool 30. This embodiment shows a secondary shoulder component 39 comprising a straight internal surface 94. FIG. 15 is a perspective view of a pin and box connection 32, 31 comprising a taper box and pin thread 95, 96. It is believed, but not wanting to be bound by any theory, that a tapered box and pin thread 95, 96 may improve load transmission.

Figure 16:
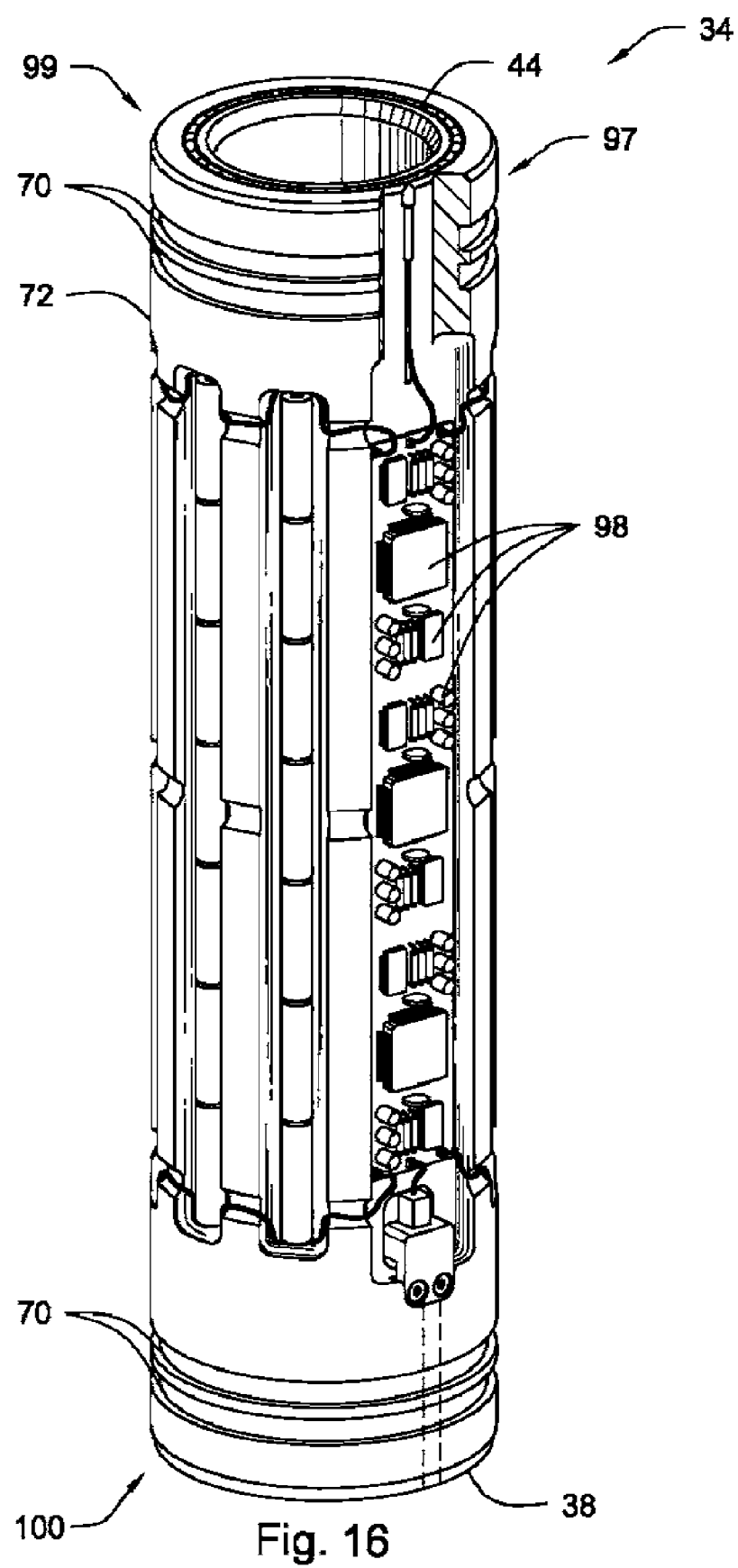
FIG. 16 is a perspective view of a floating component.
Figure 17:
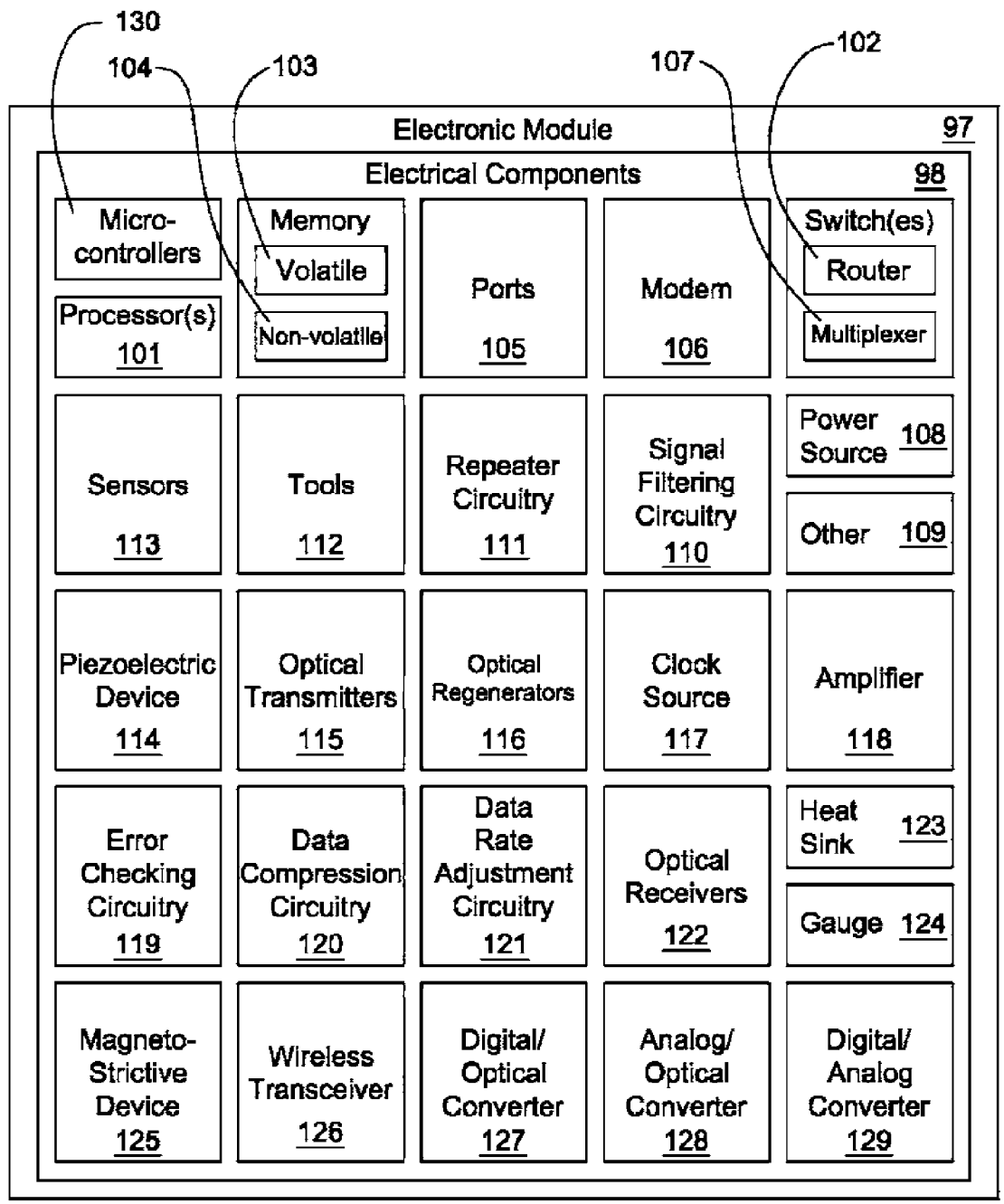
FIG. 17 is a block diagram of a floating component.

FIG. 16 is a perspective view of a floating component 34. The floating component 34 is an electronics module 97 comprising electronic components 98. The electronics module 98 comprises the second communications element 44 on a first end 99. The second end 100 of the electronics module may comprise the fourth communications element 38. Further recesses 70 for elastic material, such as an O-ring are disposed in the outer diameter 72. The electronic components 98 may be data transmission components and/or control components. The electronic components 98 are shown in FIG. 17 and may be selected from the group consisting of signal filtering circuitry 110, signal error checking circuitry 119, device control circuitry, modems 106, processors 101, optical regenerators 116, optical transmitters 115, optical receivers 122, repeater circuitry 111, sensors 113, routers 102, switches 107, volatile memory 103, non-volatile memory 104, amplifiers 118, clock sources 117, data compression circuitry 120, data rate adjustment circuitry 121, piezoelectric devices 114, magnetostrictive devices 125, gauges 124, wireless transceivers 126, digital/optical converters 127, analog/optical converters 128, digital/analog converters 129, ports 105, tools, 112, power sources 108, heat sinks 123, microcontrollers 130 and other networking circuitry.

Data and/or power signals may experience attenuation from one portion of a downhole network to another. Repeaters 111 and/or amplifiers 118 may be used to repeat or amplify signals from one portion of the downhole tool string to another. Heat sinks 123 may help to cool off other electronic components 98 in the floating component 34. Further the floating component 34 may be a turbine, Moineau, or displacement generator. Alternatively, the floating component 34 may also a mud siren for acoustic transmission.

Whereas the present invention has been described in particular relation to the drawings attached hereto, it should be understood that other and further modifications apart from those shown or suggested herein, may be made within the scope and spirit of the present invention.

What is claimed is:

1. A double shoulder downhole tool connection, comprising:
   box and pin connections having mating threads intermediate mating primary and secondary shoulders;
   a secondary shoulder component retained in the box connection intermediate a floating component and the primary shoulders;
   wherein the secondary shoulder component and the pin connection cooperate to transfer a portion of makeup load to the box connection.

2. The connection of claim 1, wherein the downhole tool is selected from the group consisting of drill pipe, drill collars, production pipe, and reamers.

3. The connection of claim 1, wherein the floating component is selected from the group consisting of electronics modules, generators, gyroscopes, power sources, mud sirens, and stators.

4. The connection of claim 1, wherein the floating component comprises data transmission components selected from the group consisting of signal filtering circuitry, signal error checking circuitry, modems, optical regenerators, optical transmitters, optical receivers, repeater circuitry, routers, switches, amplifiers, data compression circuitry, data rate adjustment circuitry, wireless transceivers, digital/optical converters, analog/optical converters, digital/analog converters, ports.

5. The connection of claim 1, wherein the floating component comprises control components selected from the group consisting of device control circuitry, processors, piezoelectric devices, magnetostrictive devices, gauges, power sources, heat sinks, microcontrollers, clock sources, sensors, volatile memory, and non-volatile memory.

6. The connection of claim 1, wherein at least a portion of the floating component is in physical contact the downhole tool.

7. The connection of claim 1, wherein the floating component and the secondary shoulder component are separated by at least 0.01 mm.

8. The connection of claim 1, wherein the floating component comprises an O-ring disposed within a recess in the floating component.

9. The connection of claim 1, wherein an insert located in the bore of the downhole tool is adjacent the secondary shoulder component and contacts an end of the floating component.

10. The connection of claim 1, wherein the pin connection comprises an internal shoulder.

11. The connection of claim 1, wherein a biasing element is intermediate the internal shoulder of the pin connection and the insert, wherein the biasing element urges the insert towards the floating component.

12. The connection of claim 1, wherein the insert comprises a first communications element adjacent a second communications element in the floating component.

13. The connection of claim 12, wherein the first and second communications elements are selected from the group consisting of inductive couplers, direct electrical contacts, optic couplers, and combinations thereof.

14. The connection of claim 12, wherein the first communications element is intermediate and adapted to relay data or power between the floating component and a first conductor.

15. The connection of claim 13, wherein the first conductor is selected from the group consisting of coaxial cables, copper wires, optical fibers, triaxial cables, and twisted pairs of wires.

16. The connection of claim 1, wherein the downhole tool comprises a third communications element adjacent a fourth communications element in another end of the floating component.

17. The connection of claim 16 wherein the third and fourth communications elements are selected from the group consisting of inductive couplers, direct electrical contacts, optic couplers, and combinations thereof.

18. The connection of claim 16, wherein the second communications element is intermediate and adapted to relay data or power between the floating component and a second conductor.

19. The connection of claim 18, wherein the second conductor is selected from the group consisting of coaxial cables, copper wires, optical fibers, triaxial cables, and twisted pairs of wires.

20. The connection of claim 1, wherein the secondary shoulder component comprises an interface to the box connection selected from the group consisting of radial grooves, axial grooves, tapered grooves, radial protrusions, axial protrusions, tapered protrusions, shoulders and threads.

21. The connection of claim 1, wherein the secondary shoulder component is segmented.

22. The connection of claim 1, wherein the secondary shoulder comprises a tapered internal surface.

23. The connection of claim 1, wherein the pin connection and the box connection comprise a taper less than 5 degrees.

24. The connection of claim 1, wherein pin connection comprises a pin thread and the box connection comprises a box thread.

25. The connection of claim 24, wherein the pin thread comprises a stress relief groove.

26. The connection of claim 24, wherein the box thread comprises a stress relief groove.

27. The connection of claim 24, wherein the box and pin threads comprise thread roots comprising at least two tapers.

28. The connection of claim 24, wherein the box thread and pin thread comprise a double thread start.

* * * * *